March 8, 1932.    V. LOUGHEED    1,849,012
SCREW PROPELLER
Filed Feb. 19, 1930    3 Sheets-Sheet 1

INVENTOR
VICTOR LOUGHEED
BY Harold Todd
ATTORNEY

March 8, 1932.  V. LOUGHEED  1,849,012
SCREW PROPELLER
Filed Feb. 19, 1930   3 Sheets-Sheet 2

INVENTOR
VICTOR LOUGHEED
BY Harold Todd
ATTORNEY

Patented Mar. 8, 1932

1,849,012

UNITED STATES PATENT OFFICE

VICTOR LOUGHEED, OF WASHINGTON, DISTRICT OF COLUMBIA

SCREW PROPELLER

Application filed February 19, 1930. Serial No. 429,690.

My invention relates broadly to an improvement in screw propellers, more particularly to automatic screw propellers wherein means are provided for automatically actuating the pitch variation of a propeller blade suspended against centrifugal force by a system of wires.

An object of my invention is to provide a simple, reliable and inexpensive mechanism whereby the blade angle can be controlled angularly within any moderate range, of a few degrees, and such angular change caused to occur at any desired speed or rotation of the propeller.

Another object of my invention is to provide a device that is very easy to construct and can be readily assembled, thus cutting down the expense of manufacturing variable pitch propellers.

With the above and other objects in view, the invention consists in the construction, combination and arrangement of parts as will be described more fully hereinafter.

Reference is to be had to the accompanying drawings forming a part of this specification, in which like reference characters indicate corresponding parts throughout the several views, and in which.

Figure 1:
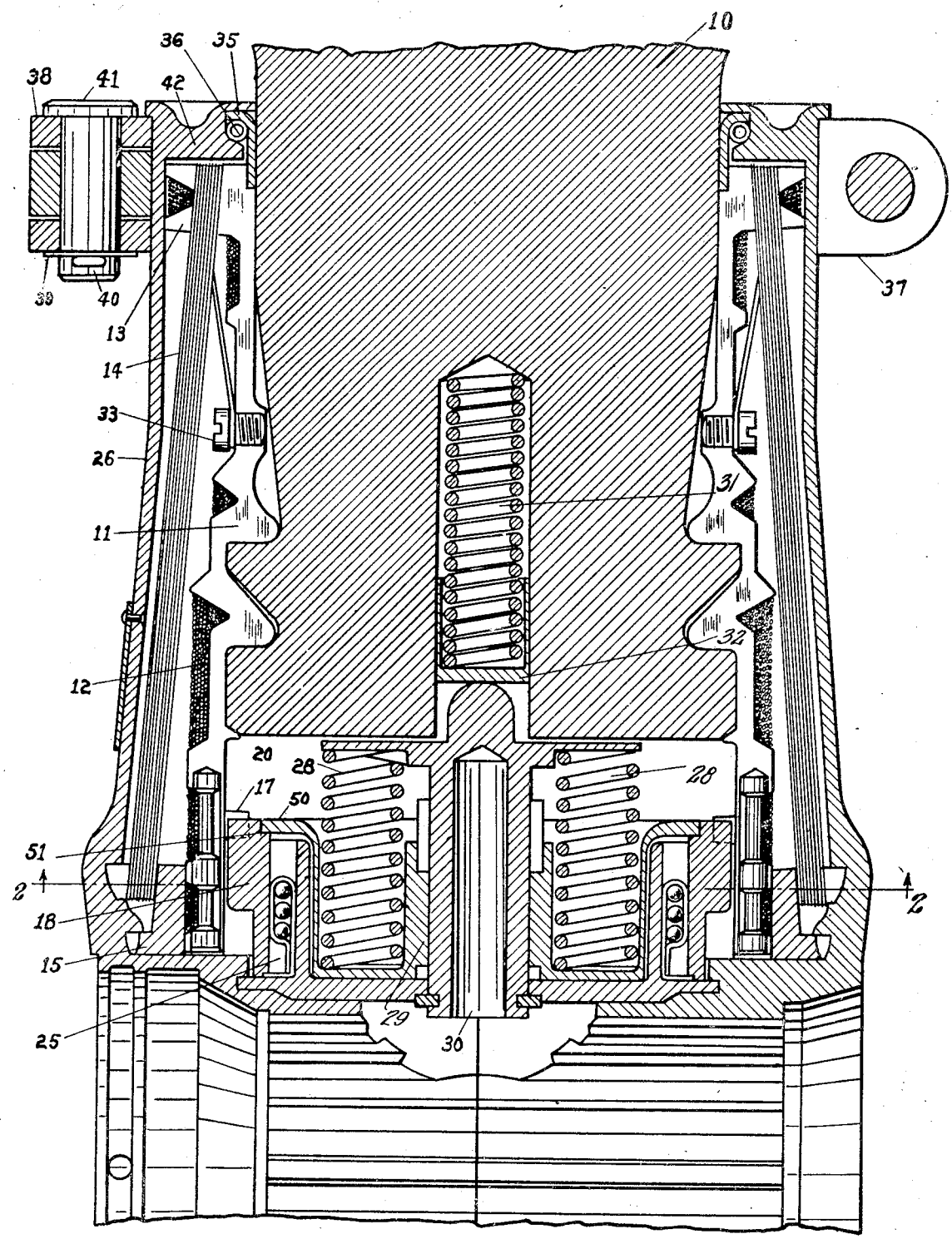
Figure 1 is a cross section in a plane through the axis of a blade as contained in an automatic propeller hub shown in my improved mechanism.

Referring more particularly to the drawings, 10 indicates the root of a blade shown inserted in a semi-permanent split ferrule or skirt 11 which is attached to the blade 10 by a series of wrappings of piano wire 12, so that the two must rotate together. This ferrule 11 bears a notched flange 13 by which the blade 10 is suspended against centrifugal force by a system of piano wires 14, which are wound back and forth in an anchor ring 15, notched similarly to the flange 13. The ferrule 11 has in its skirt the ring of studs 17 affixed thereto.

Figure 2:
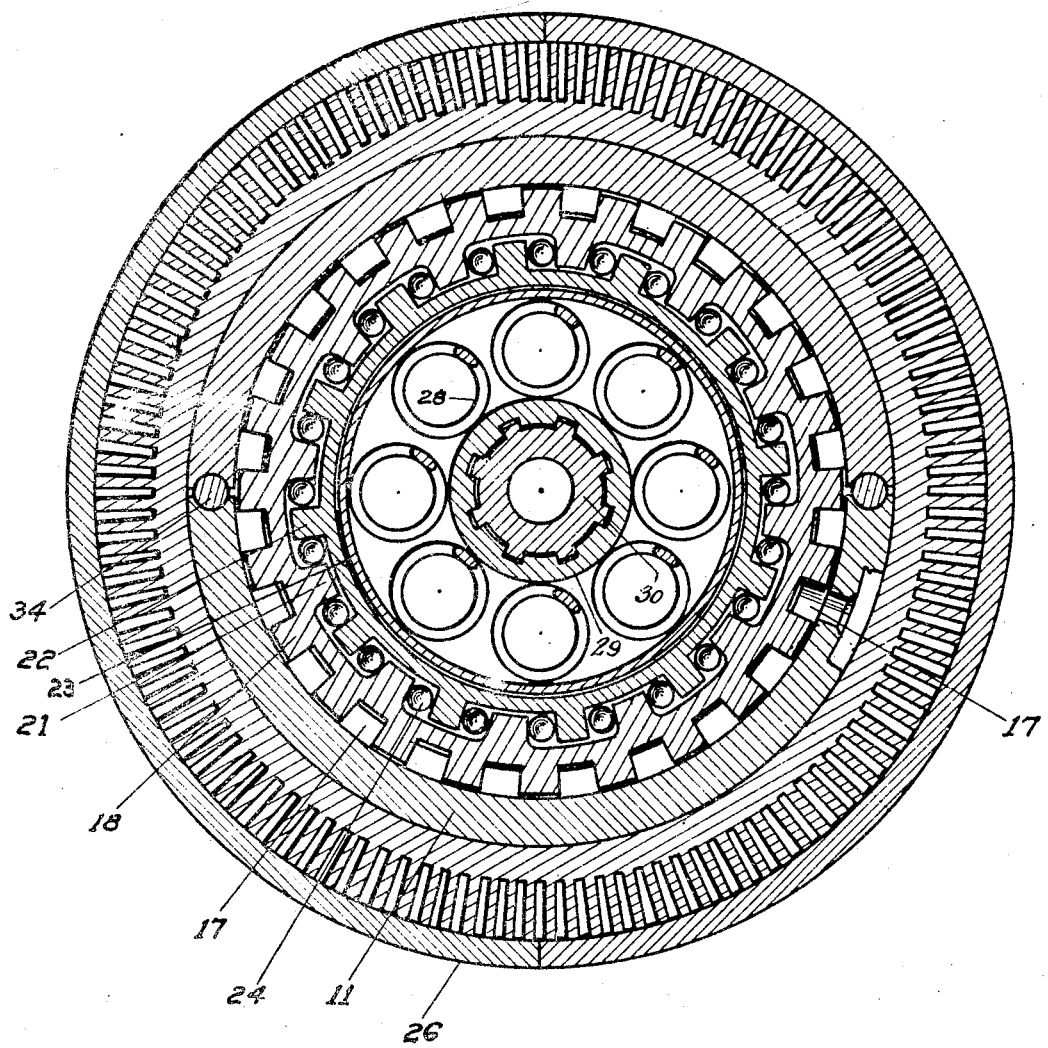
Figure 2 is a cross section taken on line 2—2 of Figure 1.
Figure 4:
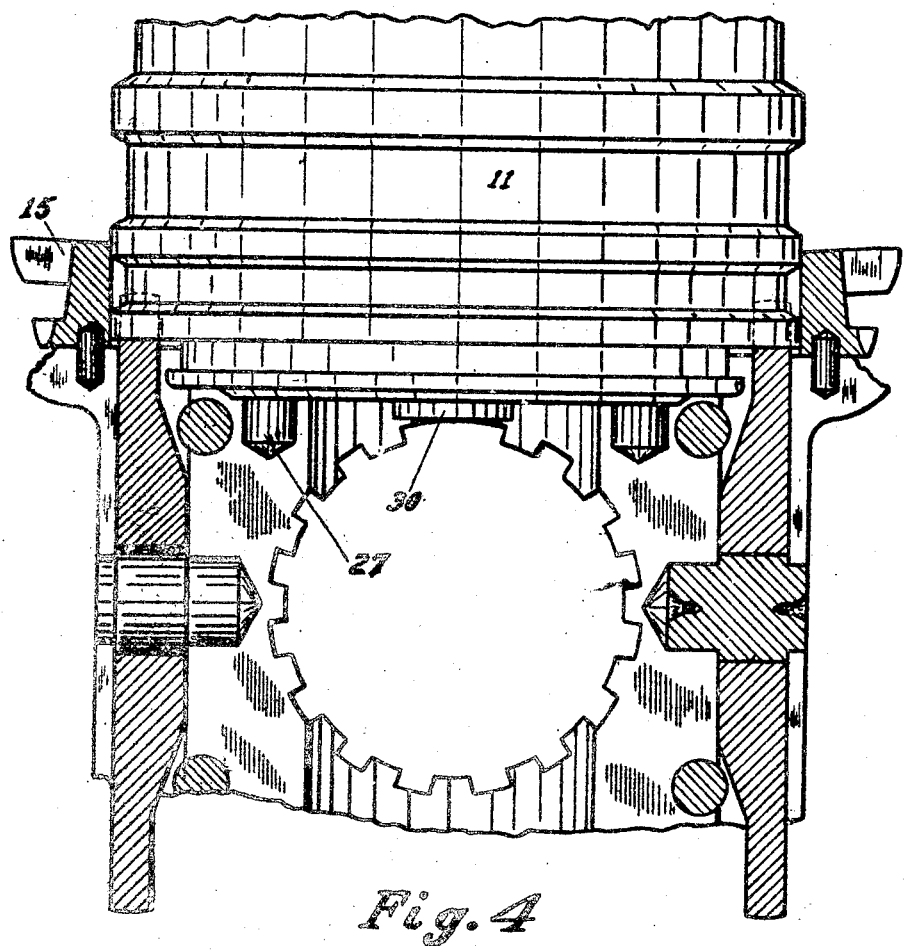
Figure 4 is a part of an automatic propeller hub broken away to show a detail of my improved mechanism.

Also within the skirt 11 is actuating ring 18, which on its outer face carries a series of cam slots 19, one for each of the plurality of studs 17. A clearance or space 20, above the actuating ring 18, is provided so that, under centrifugal force, as the blade 10 speeds up, the rise of the ring 18 away from the axis of rotation, must act to cause rotation of the ferrule 11 and with it the attached blade 10. The angular reaction of the actuating ring 18, tending to turn in the opposite direction to that in which the blade 10 is to turn, is taken by splines 21 (Figure 2) on the innerside of the actuating ring 18, and which are separated from splines 22 on a ring guide 23 by a row of balls 24, interposed between the pairs of splines 21 and 22 so as to present a minimum resistance to the necessary up and down movement of ring 18. A ball retainer 25 is provided to keep the balls 24 in place and the ring guide 23 is locked against rotation in a hub 26 by dowels 27.

A series of springs 28, interposed between a spring cup 29 and a center stud 30, by pressing down on ring 18, through boss 50 of cup 29 bearing in a groove 51 in the ring 18, normally keeps the actuating ring 18 down in the normal or rest position.

Figure 3:
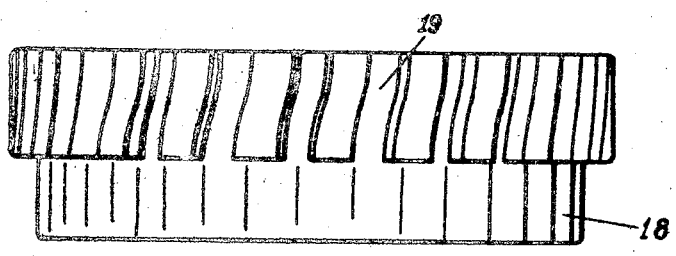
Figure 3 is a plan view of the cam slots and engaging studs of my improved device wherewith actuation of a blade is obtained.

Since the pressure of the springs 28 remains constant, irrespective of the speed at which the propeller may be running, whereas the centrifugal force acting in the actuating ring 18 and attached elements increases with the speed at which the propeller is revolving, it is obvious that by proper proportioning of the masses of ring 18 and cup 29, with corresponding suitable tensioning of the springs 28, the actuating ring 18 can be restrained from movement until the speed of the propeller rotation reaches any desired critical value, above which the movement of ring 18 up to the blade root 10 will, by the effect of cam slots 19, (Figure 3) traversing the studs 17, cause the desired angular rotation of the ferrule 11 and so of the blade 10 to occur.

It is to be noted that the ends of the cam grooves 19 (Figure 3) are straight and in parallel relation to the axis of the actuating ring 18. That is so that at the two terminal positions of its movement the studs 17, and with them the ferrule 11 and the blade 10, are locked against any possibility of angular rotation or vibration by the engagement of the splines 22 with the splines 21, through the balls 24, with the ring guide 25, which is pinned to the hub 26 by the dowels 27.

Other details shown are the center spring 31, bearing on the top of the center stud 30, through cup 32, simply for the purpose of keeping the wires 14 in tension, and the blade 10 from longitudinal movement or rattle when the propeller is not running.

At 33 is shown one of a circle of screws to which are attached the ends of the system of wires 14. Spacer studs 34 are placed in a hole at the parting line between the halves of the ferrule 11 to resist the tension of the piano wire wrapping 12, and thus to prevent springing out of shape of the skirt or ferrule 11.

A cup leather 35 pressed against the hub 25 and the blade 10, by a coil-spring ring 36, retains lubricant within the hub.

A conventional clamp ring assembly 37 with clevis 38, washer 39, cotter pin 40 and bolt 41 holds the two halves of the split hub 13 together.

An inside top shoulder 42 of the hub 25 is arranged in proximity to the flange 13, of the ferrule 11, so that should the system of wires at 14 unduly stretch or break, the blade 10 will be prevented from flying out of the hub by the movement up into contact of 13 with 41.

In the practical operation of my improved device, the blade 10 rotates at a set pitch up to a predetermined rate of speed with hub 26. When rotation reaches a desired critical value set by the tension of springs 28, the centrifugal force acting on the actuating ring 18 begins to move the ring out against the tension of the spring 28. The rise of ring 18 causes through the studs 17 riding in cam grooves 19 of the ring 18 the rotation of the ferrule 11 and with it the attached blade 10. The cam grooves 19 are cut in ring 18 at an angle so as to turn the blade 10 to the proper angle of pitch at the various rates of speed. The angular reaction of the ring 18 is taken by splines 21 on the inner side of the ring, the ball bearings 24 which permit minimum resistance in movement, and the splines 22, part of ring guide 25 that is pinned to the hub 26 by the dowels 27. When the speed is decreased the ring 18 will be forced down by springs 28 and thus the blade 10 will be returned to its normal position.

What I claim is:

1. A variable-pitch propeller comprising a hub, a plurality of blades, flexible wires holding said blades in said hub against centrifugal force due to its mass, and an actuating ring for each of said blades for producing and limiting angular movement of said blades.

2. A variable-pitch propeller comprising a hub, a plurality of blades, inherently pliant elements attached from said hub to said blades for holding said blades in said hub, against centrifugal force due to mass, an actuating ring in said hub for each of said blades, and means bearing on said rings whereby said rings are reciprocated outwardly by centrifugal force and inwardly by said bearing means to produce and limit angular movement of said blades at predetermined speeds.

VICTOR LOUGHEED.